(12) United States Patent
Chen et al.

(10) Patent No.: US 11,824,682 B1
(45) Date of Patent: Nov. 21, 2023

(54) CAN-OPEN MASTER REDUNDANCY IN PLC-BASED CONTROL SYSTEM

(71) Applicant: Schlumberger Technology Corporation, Sugar Land, TX (US)

(72) Inventors: Limin Chen, Houston, TX (US); Vikas Rakhunde, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/160,377

(22) Filed: Jan. 27, 2023

(51) Int. Cl.
*H04L 12/40* (2006.01)

(52) U.S. Cl.
CPC .. *H04L 12/40013* (2013.01); *H04L 12/40019* (2013.01); *H04L 2012/40215* (2013.01)

(58) Field of Classification Search
CPC ......... H04L 12/40013; H04L 12/40019; H04L 2012/40215
See application file for complete search history.

(56) References Cited

U.S. PATENT DOCUMENTS

| | | |
|---|---|---|
| 2,028,046 A | 1/1936 | Edison |
| 5,331,318 A | 7/1994 | Montgomery |
| 5,597,042 A | 1/1997 | Tubel |
| 5,662,165 A | 9/1997 | Tubel |
| 5,706,892 A | 1/1998 | Aeschbacher, Jr |
| 5,706,896 A | 1/1998 | Tubel |
| 5,730,219 A | 3/1998 | Tubel |
| 5,732,776 A | 3/1998 | Tubel |
| 5,934,371 A | 8/1999 | Bussear |
| 5,959,547 A | 9/1999 | Tubel et al. |
| 5,992,250 A | 11/1999 | Kluth |
| 6,006,832 A | 12/1999 | Tubel |
| 6,012,015 A | 1/2000 | Tubel |
| 6,046,685 A | 4/2000 | Tubel |
| 6,068,053 A | 5/2000 | Shaw |

(Continued)

FOREIGN PATENT DOCUMENTS

| | | |
|---|---|---|
| CN | 102425390 A | 4/2012 |
| CN | 110709579 A | 1/2020 |

(Continued)

OTHER PUBLICATIONS

Cameron, "Marinor Stena SHI Hull 1669 Drill Max 2—Subsea Multiplex BOP Control System: Operation and Maintenance Manual", Cameron International Corporation, 146 pages, 2010.

*Primary Examiner* — Stephen J Clawson
(74) *Attorney, Agent, or Firm* — Kelly McKinney

(57) ABSTRACT

A system for controlling equipment at a wellsite includes a surface PLC, a first subsea PLC, a second subsea PLC, a first CAN module, a second CAN module, and a CAN network. The surface PLC is configured to receive a parameter that is measured by a sensor and to transmit a first signal to the first subsea PLC, the second subsea PLC, or both in response to the parameter. The first subsea PLC or the second subsea PLC, or both are configured to transmit a second signal to the first CAN module, the second CAN module, or both in response to the first signal. The first CAN module, the second CAN module, or both are configured to transmit a third signal to the CAN network in response to the second signal. The CAN network is configured to control the equipment in response to the third signal.

20 Claims, 11 Drawing Sheets

At Normal System Startup: CAN_A will be active, CAN_B will be standby

If PLC A never power up, then PLC B and Central PLC will detect the Heartbeat failure at PLC A, the PLC B will then activate CAN_B If PLC B power up and CAN_B active before A PLC power up, CAN_A will be in stand by status when A PLC power up

(56) References Cited

U.S. PATENT DOCUMENTS

| | | | |
|---|---|---|---|
| 6,075,462 A | 6/2000 | Smith | |
| 6,125,938 A | 10/2000 | Garcia-Soule | |
| 6,160,492 A | 12/2000 | Herman | |
| 6,161,618 A | 12/2000 | Parks | |
| 6,179,057 B1 | 1/2001 | Fontana | |
| 6,209,640 B1 | 4/2001 | Reimers | |
| 6,247,536 B1 | 6/2001 | Leismer | |
| 6,257,332 B1 | 7/2001 | Vidrine | |
| 6,271,766 B1 | 8/2001 | Didden | |
| 6,276,454 B1 | 8/2001 | Fontana | |
| 6,279,660 B1 | 8/2001 | Hay | |
| 6,281,489 B1 | 8/2001 | Tubel | |
| 6,288,975 B1 | 9/2001 | Frederick | |
| 6,296,066 B1 | 10/2001 | Terry | |
| 6,315,461 B1 * | 11/2001 | Cairns | G02B 6/3816 385/139 |
| 6,422,315 B1 | 7/2002 | Dean | |
| 6,469,636 B1 | 10/2002 | Baird | |
| 6,484,806 B2 | 11/2002 | Childers | |
| 6,498,988 B1 | 12/2002 | Robert | |
| 6,670,880 B1 | 12/2003 | Hall | |
| 6,736,545 B2 * | 5/2004 | Cairns | H01R 13/523 385/100 |
| 6,788,980 B1 | 9/2004 | Johnson | |
| 6,801,135 B2 | 10/2004 | Schultz | |
| 6,816,082 B1 | 11/2004 | Laborde | |
| 6,851,444 B1 | 2/2005 | Kohl et al. | |
| 6,896,055 B2 | 5/2005 | Koithan | |
| 6,901,464 B2 | 5/2005 | Risi | |
| 7,216,714 B2 | 5/2007 | Reynolds | |
| 7,261,162 B2 | 8/2007 | Deans | |
| 7,328,741 B2 | 2/2008 | Allen | |
| 7,576,447 B2 | 8/2009 | Biester | |
| 7,695,301 B2 * | 4/2010 | Mudge, III | H01R 13/533 439/732 |
| 7,921,917 B2 | 4/2011 | Kotrla | |
| 8,149,133 B2 | 4/2012 | Milne | |
| 8,159,365 B2 | 4/2012 | Milne | |
| 8,212,378 B2 | 7/2012 | Biester | |
| 8,511,388 B2 | 8/2013 | Milne | |
| 8,511,389 B2 | 8/2013 | Fenton | |
| 8,734,026 B2 * | 5/2014 | Nagengast | G02B 6/3816 385/77 |
| 9,057,846 B2 * | 6/2015 | Xi | H04L 12/4625 |
| 9,281,906 B2 | 3/2016 | Choudhury | |
| 9,291,020 B2 | 3/2016 | McWhorter | |
| 9,322,264 B2 | 4/2016 | Gutierrez | |
| 9,422,782 B2 | 8/2016 | McWhorter | |
| 9,475,502 B2 * | 10/2016 | Fung | A61B 5/18 |
| 9,658,130 B2 | 5/2017 | Veeningen | |
| 9,803,448 B2 | 10/2017 | Holmes | |
| 9,879,526 B2 | 1/2018 | Jaffrey | |
| 9,970,287 B2 | 5/2018 | Jaffrey | |
| 10,000,987 B2 | 6/2018 | Springett | |
| 10,018,007 B2 | 7/2018 | Panicker-Shah | |
| 10,048,673 B2 | 8/2018 | Holmes | |
| 10,196,871 B2 | 2/2019 | Holmes | |
| 10,202,839 B2 | 2/2019 | Scott | |
| 10,246,994 B2 | 4/2019 | Jaffrey | |
| 10,404,052 B2 | 9/2019 | Brooks | |
| 10,539,010 B2 | 1/2020 | Gutierrez | |
| 10,545,803 B2 | 1/2020 | Holmes | |
| 10,787,877 B2 | 9/2020 | Pedersen | |
| 10,788,543 B2 | 9/2020 | Emerich | |
| 10,876,369 B2 | 12/2020 | Holmes | |
| 11,035,217 B2 | 6/2021 | Holmes | |
| 11,180,967 B2 | 11/2021 | Pedersen | |
| 11,480,023 B2 | 10/2022 | Sakhawat | |
| 2004/0015618 A1 | 1/2004 | Risi | |
| 2004/0015619 A1 | 1/2004 | Brown | |
| 2004/0262008 A1 | 12/2004 | Deans | |
| 2007/0107904 A1 | 5/2007 | Donahue | |
| 2009/0194290 A1 | 8/2009 | Parks | |
| 2009/0265395 A1 | 10/2009 | Milne | |
| 2009/0288836 A1 | 11/2009 | Goodall | |
| 2010/0011853 A1 | 1/2010 | Anthony | |
| 2010/0171637 A1 | 7/2010 | Jaffrey | |
| 2011/0100710 A1 | 5/2011 | Fossli | |
| 2011/0304218 A1 | 12/2011 | Hyland | |
| 2012/0000646 A1 | 1/2012 | Liotta | |
| 2012/0098674 A1 | 4/2012 | McStay | |
| 2012/0132430 A1 | 5/2012 | Ebenezer | |
| 2012/0197527 A1 | 8/2012 | McKay et al. | |
| 2013/0058192 A1 | 3/2013 | Gateman | |
| 2013/0083627 A1 | 4/2013 | Yates | |
| 2013/0103208 A1 | 4/2013 | Niemeyer | |
| 2013/0144531 A1 | 6/2013 | Johnston | |
| 2013/0153241 A1 | 6/2013 | Mallinson | |
| 2013/0341094 A1 | 12/2013 | Taherian | |
| 2014/0023365 A1 * | 1/2014 | Xi | G02B 6/3816 398/58 |
| 2014/0064029 A1 | 3/2014 | Jaffrey | |
| 2014/0311735 A1 | 10/2014 | Landrith, II | |
| 2015/0094866 A1 | 4/2015 | Pereira | |
| 2015/0331971 A1 | 11/2015 | Scollard | |
| 2016/0001781 A1 * | 1/2016 | Fung | G07C 9/37 701/36 |
| 2017/0314357 A1 * | 11/2017 | Kent | G01N 15/0826 |
| 2017/0359128 A1 * | 12/2017 | Xi | H04B 10/278 |
| 2018/0083715 A1 * | 3/2018 | Greene | H04B 10/807 |
| 2019/0007794 A1 * | 1/2019 | Thakur | H04W 4/023 |
| 2019/0085468 A1 * | 3/2019 | Amaya | C23F 13/16 |
| 2019/0368299 A1 | 12/2019 | Jorud | |
| 2020/0150642 A1 | 5/2020 | Thwaites | |
| 2020/0162283 A1 * | 5/2020 | Mo | H04L 43/10 |
| 2020/0182004 A1 * | 6/2020 | Tesla | E21B 33/0355 |
| 2020/0190931 A1 * | 6/2020 | Moen | E21B 41/0007 |
| 2020/0192467 A1 | 6/2020 | Capgolu | |
| 2020/0332653 A1 | 10/2020 | Gutierrez | |
| 2021/0105619 A1 * | 4/2021 | Kashani | G06F 21/32 |
| 2021/0152391 A1 * | 5/2021 | Mo | H04L 41/0663 |
| 2021/0262312 A1 | 8/2021 | Holmes | |
| 2022/0018205 A1 | 1/2022 | Holmes | |
| 2022/0282587 A1 | 9/2022 | Ducamin | |
| 2023/0118770 A1 * | 4/2023 | Jia | H04J 14/0279 398/42 |

FOREIGN PATENT DOCUMENTS

| | | |
|---|---|---|
| EP | 2383429 A3 | 7/2015 |
| GB | 2284257 B | 6/1998 |
| GB | 2361597 A | 10/2001 |
| GB | 2477034 A | 7/2011 |
| GB | 2478761 A | 9/2011 |
| KR | 10-2028046 B1 | 10/2019 |
| WO | 1998020506 A1 | 5/1998 |
| WO | 1998007049 A9 | 7/1998 |
| WO | 2001054140 A1 | 7/2001 |
| WO | 2002006716 A1 | 1/2002 |
| WO | 2020251821 A1 | 12/2020 |
| WO | 2021076704 A1 | 4/2021 |
| WO | 2022109548 A1 | 5/2022 |
| WO | WO-2023039052 A1 * | 3/2023 |

* cited by examiner

At Normal System Startup: CAN_A will be active, CAN_B will be standby

If PLC A never power up, then PLC B and Central PLC will detect the Heartbeat failure at PLC A, the PLC B will then activate CAN_B If PLC B power up and CAN_B active before A PLC power up, CAN_A will be in stand by status when A PLC power up

Detect Method: CAN Module status bits: MasterStatus1.Bit1=1 (CAN Bus Error)
Failover? Yes
A PLC -> CAN_A.Control1=0,
B PLC -> If A PLC heartbeat OK then CAN_B.Control1=2
Note: If only either the CAN_H or CAN_L wire is broken, the SDO command still can go through but in a slow pace. Also, it will still trigger MasterStatus1.Bit1=1

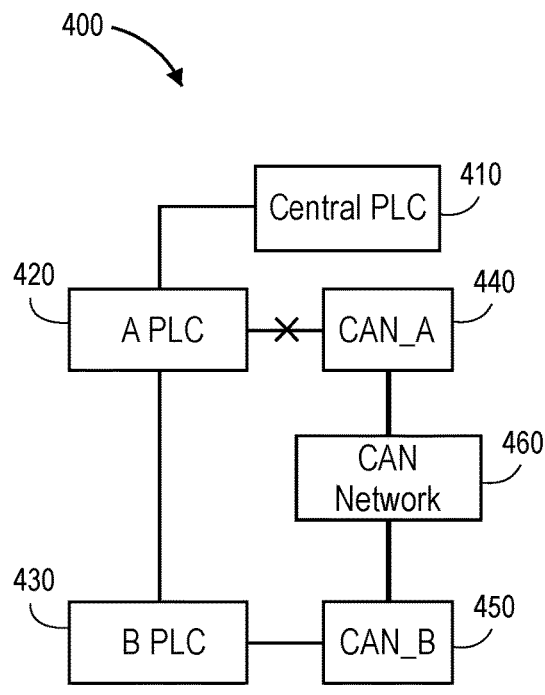

Detect Method: CAN Module status bits:
MasterStatus0=0
MasterStatus1=0
MasterStatus2=0
MasterStatus3=0
Failover? Yes
A PLC -> CAN_A.Control1=0,
B PLC -> If A PLC heartbeat OK then CAN_B.Control1=2
Note: depends on how long the down time last, the CAN_A may need to reboot to get back online after the connection is established again

FIG. 7

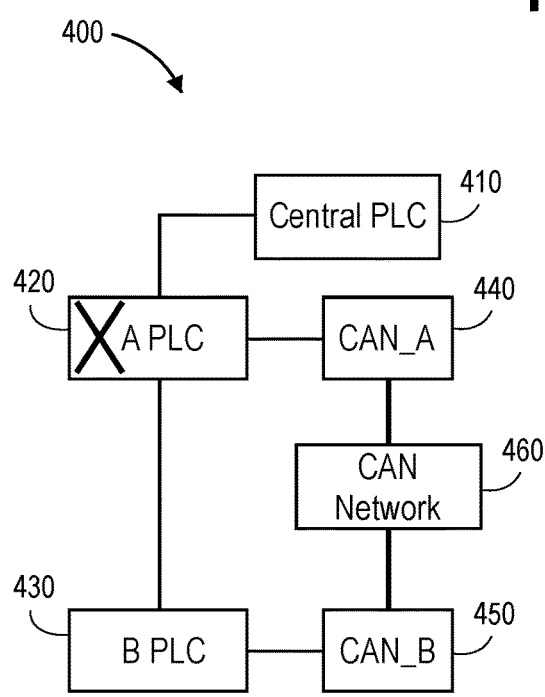

Detect Method: PLC Heartbeat Fail or maybe PS A 24V fail detection by B PLC and Central PLC:
In this case the CAN_A will be deactivated automatically
Failover? Yes
B PLC -> CAN_B.Control1=2
Note: if A PLC recover later, then CAN_A will in standby status

FIG. 8

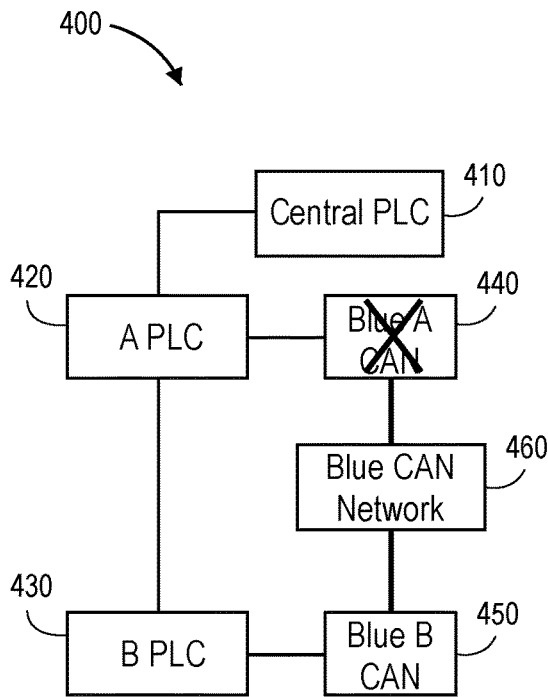

Detect Method: CAN Module status bits:
MasterStatus0=0
MasterStatus1=0
MasterStatus2=0
MasterStatus3=0
Failover? Yes
A PLC -> CAN_A.Control1=0,
B PLC -> If A PLC heartbeat OK then CAN_B.Control1=2
Note: If CAN_A reboot to OK later. It will enter the standby status if CAN_B already takes over

FIG. 9

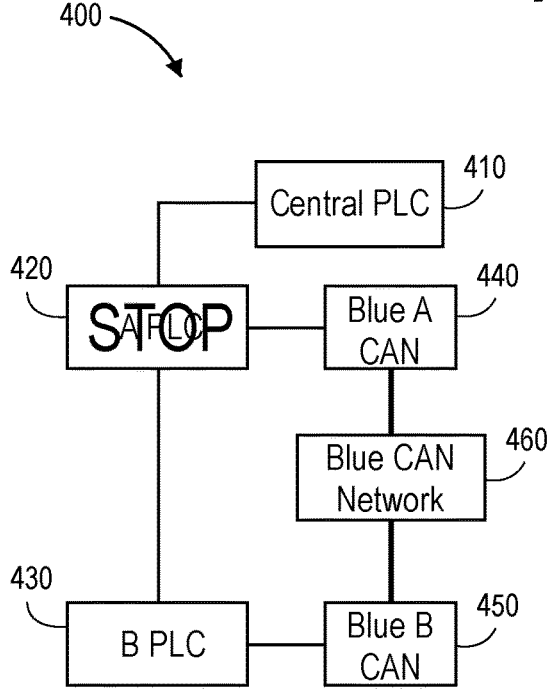

Detect Method: A PLC Heartbeat Fail detected by a B PLC and Central PLC:
In this case the CAN_A will be still active (but change from Operational to Pre-Operational mode) and now way to be deactivated by the A PLC
Failover? Yes
B PLC -> CAN_A.Control1=2,
Note: In this case CAN_A is in pre-operational mode and CAN_B will be in operational mode, both will be the master, but it will not be a conflict to each other. If then A PLC is back to run mode (manually or for any reason automatically), the CAN_A will enter standby mode

FIG. 10

Detect Method:
In A PLC: All other PLC hearbeat lost, also TCP Comm to Central PLC status should change
In B PLC and Central PLC: Sees A PLC heartbeat lost Central PLC should see TCP comm status change as well
Failover? Yes
A PLC -> CAN_A.Control1=0,
B PLC -> CAN_B.Control1=2
Note: If A PLC connected back later. CAN_A will enter the standby status if CAN_B already takes over

CAN-OPEN MASTER REDUNDANCY IN PLC-BASED CONTROL SYSTEM

BACKGROUND

Programmable logic controllers (PLCs) have been widely used in automation control systems due to their programming capability, reliability, and flexibility in a variety of different applications. The PLC can communicate with a plurality of devices using different industrial standard protocols. One of the devices may be a controller area network (CAN). The CAN is a serial communication bus designed for robust and flexible performance in harsh environments such as industrial and automotive applications. CAN-open is a communication protocol and/or device profile specification. CAN-open can be utilized in the PLC-based system with built-in or additional module support. However, some of the CAN-open protocol features may not be available when realizing particular configurations in the PLC-based system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system for controlling equipment at a wellsite is disclosed. The system includes a surface programmable logic controller (PLC), a first subsea PLC configured to connect to the surface PLC, a second subsea PLC configured to connect to the first subsea PLC, a first controller area network (CAN) module configured to connect to the first subsea PLC, a second CAN module configured to connect to the second subsea PLC, and a CAN network configured to connect to the first CAN module and the second CAN module. The surface PLC is configured to receive one or more parameters that are measured by a sensor and to transmit a first signal to the first subsea PLC, the second subsea PLC, or both in response to the one or more parameters. The first subsea PLC or the second subsea PLC, or both are configured to transmit a second signal to the first CAN module, the second CAN module, or both in response to the first signal. The first CAN module, the second CAN module, or both are configured to transmit a third signal to the CAN network in response to the second signal. The CAN network is configured to control the equipment in response to the third signal.

In another embodiment, the system includes a surface programmable logic controller (PLC) that is located on a drilling rig. The drilling rig is positioned above a subsea wellbore. The system also includes a first subsea PLC configured to connect to the surface PLC. The first subsea PLC is located in a subsea electronic module (SEM) which is attached to a blowout preventer (BOP) stack that is at least partially above the subsea wellbore. The system also includes a second subsea PLC configured to connect to the first subsea PLC. The second subsea PLC is located in the SEM. The system also includes a first controller area network (CAN) module configured to connect to the first subsea PLC. The first CAN module is located in the SEM. The system also includes a second CAN module configured to connect to the second subsea PLC. The system also includes second CAN module is located in the SEM. The system also includes a CAN network configured to connect to the first CAN module and the second CAN module. The CAN network is distributed across the BOP stack. The surface PLC is configured to receive one or more parameters that are measured by a sensor. The sensor is configured to monitor the subsea wellbore, the SEM, the BOP stack, the equipment, or a combination thereof. The surface PLC is configured to transmit a first signal to the first subsea PLC, the second subsea PLC, or both in response to the one or more parameters. The first subsea PLC, the second subsea PLC, or both are configured to transmit a second signal to the first CAN module, the second CAN module, or both in response to the first signal. The first CAN module, the second CAN module, or both are configured to transmit a third signal to the CAN network in response to the second signal. The CAN network is configured to control the equipment in response to the third signal.

A method for controlling equipment at a wellsite is also disclosed. The method includes receiving one or more parameters at a surface programmable logic controller (PLC). The surface PLC is located on a drilling rig. The drilling rig is positioned above a subsea wellbore. The one or more parameters are measured by a sensor. The sensor is configured to monitor the subsea wellbore, a subsea electronic module (SEM), a blowout preventer (BOP) stack, the equipment, or a combination thereof. The method also includes transmitting a first signal from the surface PLC to a first subsea PLC, a second subsea PLC, or both in response to the one or more parameters. The method also includes transmitting a second signal from the first subsea PLC, the second subsea PLC, or both to a first controller area network (CAN) module, a second CAN module, or both in response to the first signal. One of the first and second CAN modules is in an active mode and the other of the first and second CAN modules is in a standby mode at any given time. The method also includes transmitting a third signal from the first CAN module, the second CAN module, or both to a CAN network in response to the second signal. The CAN network is configured to control the equipment in response to the third signal.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 7 illustrates the system shown in FIG. 4 with a first subsea programmable logic controller (PLC) disconnected from the first CAN, according to an embodiment.

FIG. 8 illustrates the system shown in FIG. 4 with the first subsea PLC in a failure state, according to an embodiment.

FIG. 9 illustrates the system shown in FIG. 4 with the first CAN module in a failure state, according to an embodiment.

FIG. 10 illustrates the system shown in FIG. 4 with the first subsea PLC in a stop mode, according to an embodiment.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
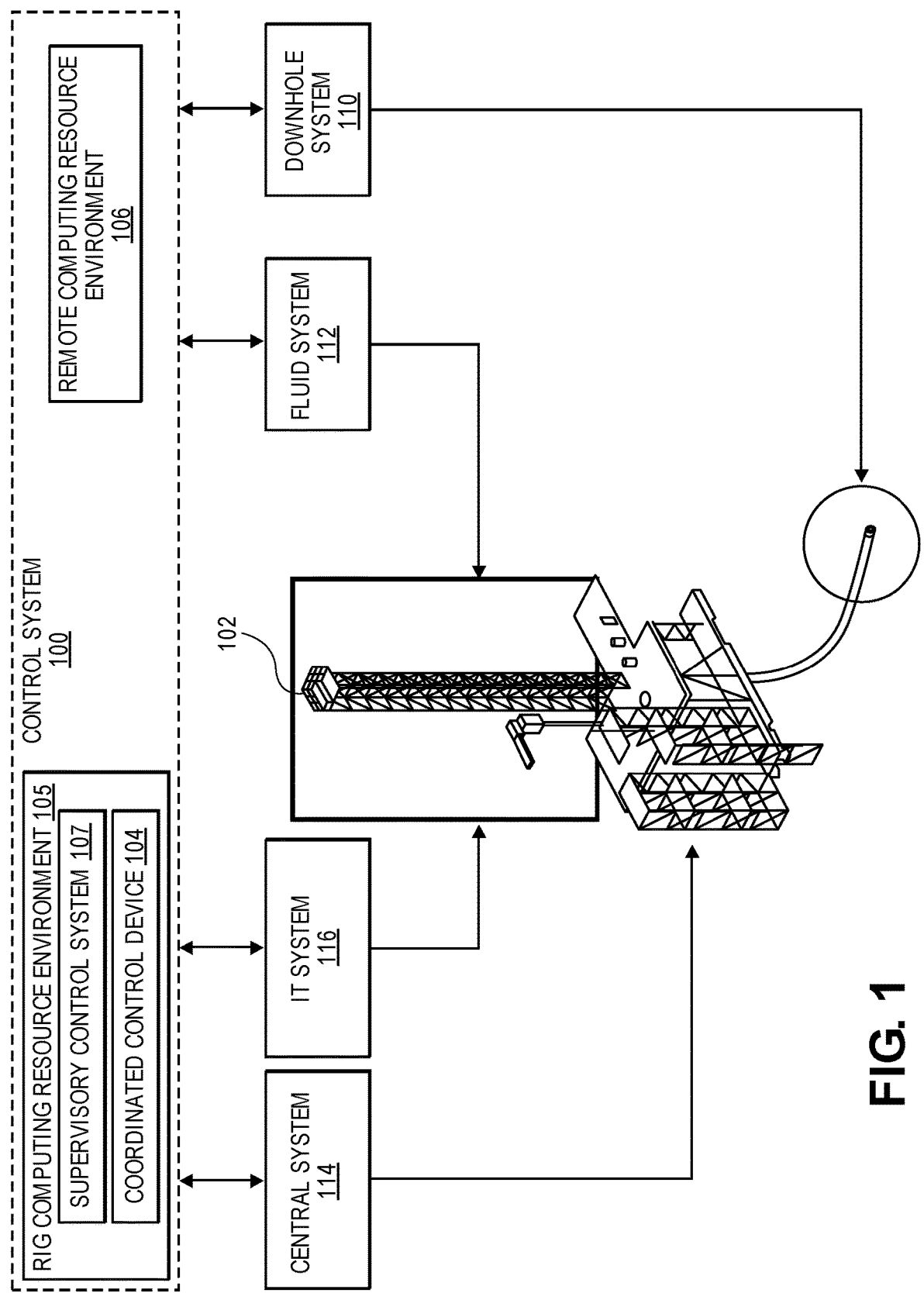
FIG. 1 illustrates a conceptual, schematic view of a control system for a drilling rig, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection). In some embodiments, the remote computing resource environment 106 may be at least partially located onsite, e.g., allowing control of various aspects of the drilling rig 102 onsite through the remote computing resource environment 105 (e.g., via mobile devices). Accordingly, "remote" should not be limited to any particular distance away from the drilling rig 102.

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. These systems 110, 112, 114 may also be examples of "subsystems" of the drilling rig 102, as described herein. In some embodiments, the drilling rig 102 may include an information technology (IT) system 116. The downhole system 110 may include, for example, a bottom-hole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, safety concerns for different control systems, etc.). An embodiment of the control system 100 that is unified, may, however, provide control over the drilling rig 102 and its related systems (e.g., the downhole system 110, fluid system 112, and/or central system 114, etc.). Further, the downhole system 110 may include one or a plurality of downhole systems. Likewise, fluid system 112, and central system 114 may contain one or a plurality of fluid systems and central systems, respectively.

In addition, the coordinated control device 104 may interact with the user device(s) (e.g., human-machine interface(s)) 118, 120. For example, the coordinated control device 104 may receive commands from the user devices 118, 120 and may execute the commands using two or more of the rig systems 110, 112, 114, e.g., such that the operation of the two or more rig systems 110, 112, 114 act in concert and/or off-design conditions in the rig systems 110, 112, 114 may be avoided.

Figure 2:
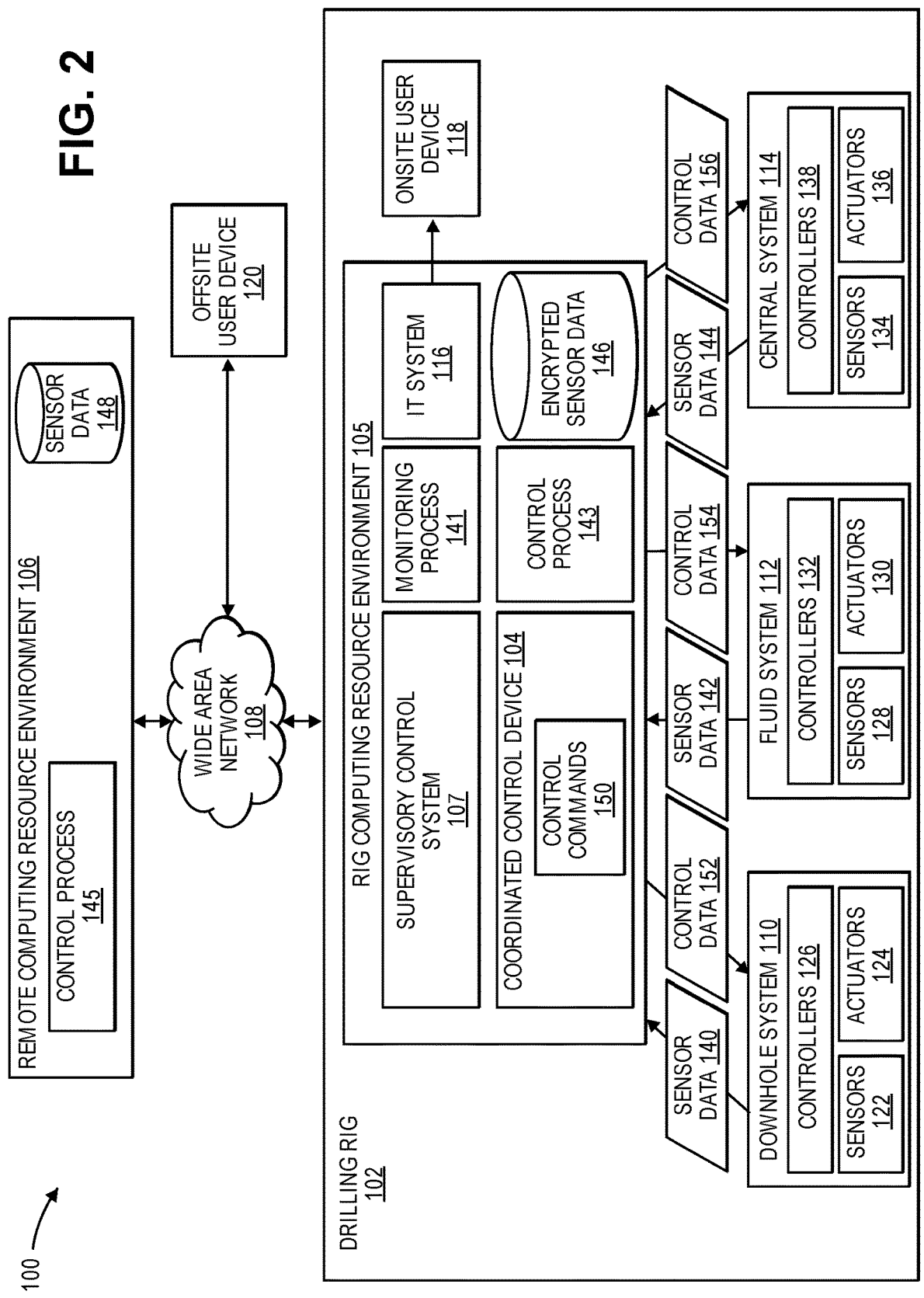
FIG. 2 illustrates a conceptual, schematic view of the control system, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The user devices 118 and/or 120 may be examples of a human-machine interface. These devices 118, 120 may allow feedback from the various rig subsystems to be displayed and allow commands to be entered by the user. In various embodiments, such human-machine interfaces may be onsite or offsite, or both.

The systems of the drilling rig 102 may include various sensors, actuators, and controllers (e.g., programmable logic controllers (PLCs)), which may provide feedback for use in the rig computing resource environment 105. For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data feedback to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data into the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. In yet another embodiment, measurements of the same physical properties using different sensors may provide information about the relative quality of each measurement, resulting in a "higher" quality measurement being used for rig control, and process applications. The variation in measurements at different locations over time may be used to determine equipment performance, system performance, scheduled maintenance due dates, and the like. Furthermore, aggregating sensor data from each subsystem into a centralized environment may enhance drilling process and efficiency. For example, slip status (e.g., in or out) may be acquired from the sensors and provided to the rig computing resource environment 105, which may be used to define a rig state for automated control. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g., tripping speed). When it is desired to maintain certain downhole pressure during tripping, the coordinated control device 104 may be used to direct the appropriate control commands. Furthermore, for mode based controllers which employ complex computation to reach a control setpoint, which are typically not implemented in the subsystem PLC controllers due to complexity and high computing power demands, the coordinated control device 104 may provide the adequate computing environment for implementing these controllers.

In some embodiments, control of the various systems of the drilling rig 102 may be provided via a multi-tier (e.g., three-tier) control system that includes a first tier of the controllers 126, 132, and 138, a second tier of the coordinated control device 104, and a third tier of the supervisory control system 107. The first tier of the controllers may be responsible for safety critical control operation, or fast loop feedback control. The second tier of the controllers may be responsible for coordinated controls of multiple equipment or subsystems, and/or responsible for complex model based controllers. The third tier of the controllers may be responsible for high level task planning, such as to command the rig system to maintain certain bottom hole pressure. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The sensor data 140, 142, 144 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a client (e.g., a thin client) configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. Furthermore, the monitoring process 141 may monitor sensor data and determine the quality of one or a plurality of sensor data. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. The virtual computing system and/or computers may provide a human-machine interface through which a user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

CAN Open Master Redundancy in PLC-Based Control System

Figure 3:
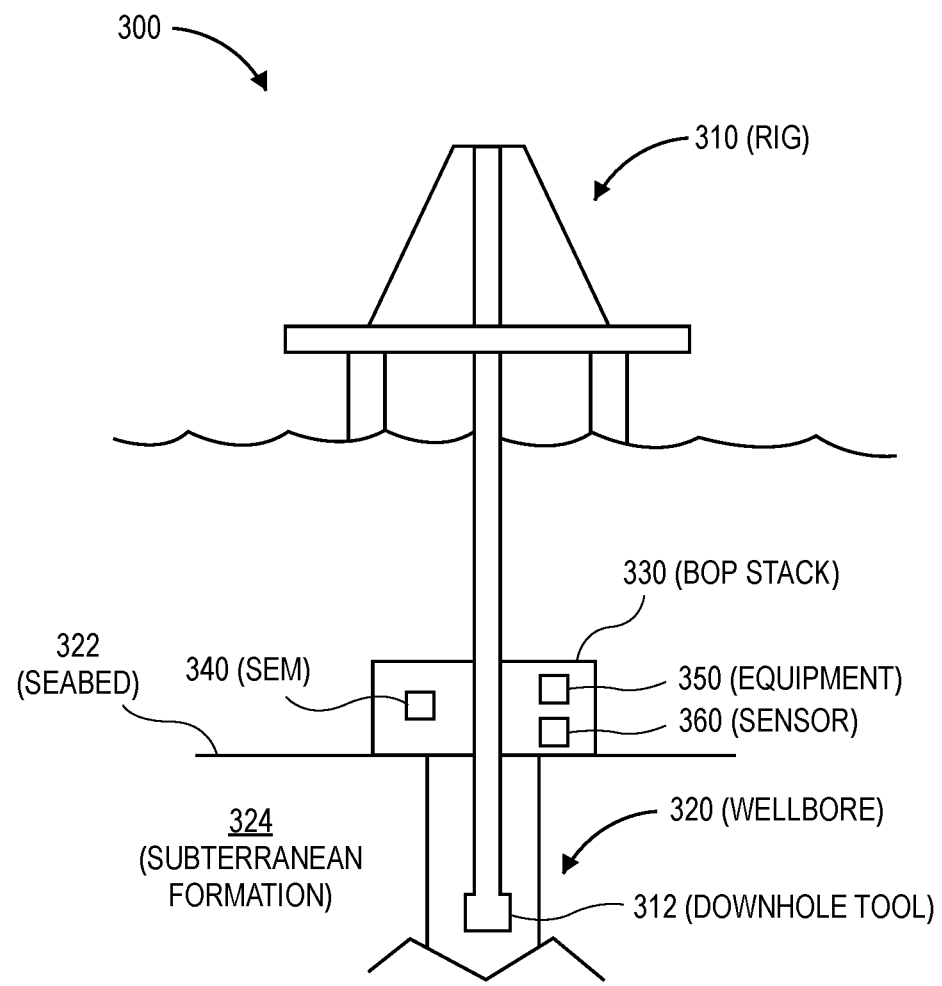
FIG. 3 illustrates a schematic view of a wellsite, according to an embodiment.

FIG. 3 illustrates a schematic view of a wellsite 300, according to an embodiment. The wellsite 300 may be on land or subsea. The wellsite 300 may include a drilling rig 310 positioned over a wellbore 320. As shown, the drilling rig 310 may control a downhole tool 312 that drills the wellbore 320 through a seabed 322 and down into a subterranean formation 324 therebelow.

The wellsite 300 may also include a blowout preventer (BOP) stack 330 positioned above or at least partially within the wellbore 320. The BOP stack 330 may provide pressure control for the wellbore 320.

The wellsite 300 may also include a subsea electronic module (SEM) 340. The SEM 340 may be connected to the BOP stack 330. The SEM 340 may communicate with one or more programmable logic controllers (e.g., described below). For example, the SEM 340 may transmit a status (e.g., position or state) of equipment (e.g., a subsea valve) to a surface PLC. In another example, the SEM 340 may receive instructions (e.g., a valve command) to actuate the equipment.

The wellsite 300 may also include equipment 350. The equipment 350 may be connected to and/or positioned on/within the drilling rig 310, the wellbore 320, the BOP stack 330, the SEM 340, or a combination thereof. The equipment 350 may be or include an actuator configured to actuate between at least a first position or state and a second position or state. More particularly, the equipment 350 may be or include a switch or a valve (e.g., a solenoid valve) in/on the BOP stack 330. In another embodiment, the equipment 350 may be or include a controller area network (CAN)-compatible actuator such as a motor, a motor driver, a driver system, a CAN-based sensor, or a combination thereof.

The wellsite 300 may also include one or more sensors (one is shown: 360). The sensor 360 may be connected to and/or positioned at least partially on/within the wellbore 320, the BOP stack 330, the SEM 340, the equipment 350, or a combination thereof. The sensor 360 may be configured to sense (e.g., measure or monitor) one or more parameters in/of the wellbore 320, the BOP stack 330, the SEM 340, the equipment 350, or a combination thereof. The parameters may be or include temperature, pressure, trajectory, resistivity, porosity, sonic velocity, gamma ray, power (e.g., voltage and/or current), position/state (e.g., of the switch or valve), or a combination thereof.

Figure 4:
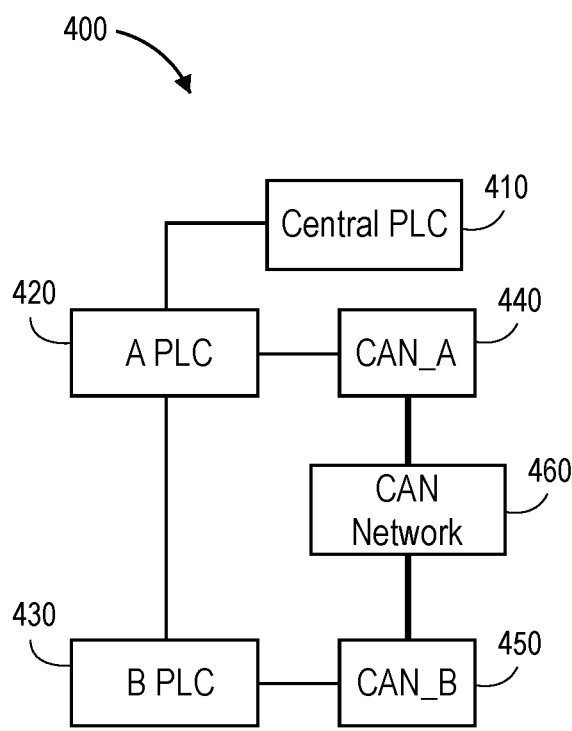
FIG. 4 illustrates a schematic view of a system that may be used at the wellsite, according to an embodiment.

FIG. 4 illustrates a schematic view of a system 400 that may be used at the wellsite 300, according to an embodiment. The system 400 may be or include a control system that is configured to control the drilling rig 310, the BOP stack 330, the SEM 340, the equipment 350, the sensor 360, or a combination thereof.

The system 400 may include one or more programmable logic controllers (PLCs) (three are shown: 410, 420, 430). The PLC 410 may be located above the water (e.g., the sea). For example, the PLC 410 may be located on the drilling rig 310. Thus, the PLC 410 may be referred to as a surface PLC or a central PLC. The surface PLC 410 may be configured to receive input from a user and/or the sensor 360. For example, the input may be or include the one or more parameters. The surface PLC 410 may also be configured to transmit one or more (e.g., first) signals in response to the input.

The PLCs 420, 430 may be located below the water. For example, the PLCs 420, 430 may be connected to and/or located within the wellbore 320, the BOP stack 330, the SEM 340, the equipment 350, the sensor 360, or a combination thereof. Thus, the PLCs 420, 430 may be referred to as subsea PLCs. The first subsea PLC 420 and/or the second subsea PLC 430 may be configured to connect to (e.g., communicate with) the surface PLC 410 (e.g., via a wire or wirelessly). The first subsea PLC 420 and/or the second subsea PLC 430 may also be configured to connect to (e.g., communicate with) one another. In one embodiment, the second subsea PLC 430 may not be directly connected to (e.g., able to communicate directly with) the surface PLC 410; rather, the communication between the PLCs 410, 430 may instead go through the first subsea PLC 420.

The first subsea PLC 420 and/or the second subsea PLC 430 may be configured to receive the parameters measured by the sensor 360 (e.g., the position/state of the valve and/or an analog pressure value) and to transmit the parameters to the surface PLC 410, which may be used to generate the first signals. The first subsea PLC 420 and/or the second subsea PLC 430 may also be configured to receive the first signals from the surface PLC 410 and to determine a controller area network (CAN) message based upon the first signals. The CAN message may be or include instructions for controlling the equipment 350. The first subsea PLC 420 and/or the second subsea PLC 430 may further be configured to transmit second signals including the CAN message.

The system 400 may also include one or more CAN modules (two are shown: 440, 450). The CAN modules 440, 450 may also be referred to as CAN master modules. The CAN modules 440, 450 may be located below the water. For example, the CAN modules 440, 450 may be connected to and/or located in the wellbore 320, the BOP stack 330, the SEM 340, the equipment 350, the sensor 360, or a combination thereof. In the embodiment shown, the first CAN module 440 may be configured to connect to the first subsea PLC 420, and the second CAN module 450 may be configured to connect to the second subsea PLC 430. In this embodiment, the first CAN module 440 may not be (e.g., directly) connected to the second subsea PLC 430, and the second CAN module 450 may not be (e.g., directly) connected to the first subsea PLC 420.

The first CAN module 440 and/or the second CAN module 450 may be configured to receive the parameters measured by the sensor 360 (e.g., the position/state of the valve and an analog pressure value) and to transmit the parameters to the first subsea PLC 420 and/or the second subsea PLC 430. The first CAN module 440 may also be configured to receive the second signals from the first subsea PLC 420 and to transmit a third signal in response to receiving the second signals. Similarly, the second CAN module 450 may be configured to receive the second signals from the second subsea PLC 430 and to transmit a third signal in response to receiving the second signal. The third signal may be or include the instructions for controlling the equipment 350.

The system 400 may also include a CAN network 460. The CAN network 460 may be located below the water. For example, the CAN network 460 may be connected to and/or located in the wellbore 320, the BOP stack 330, the SEM 340, the equipment 350, the sensor 360, or a combination thereof. For example, the CAN network 460 may be distributed across the BOP stack 330. The CAN network 460 may be configured to connect to the first CAN module 440 and/or the second CAN module 450.

The CAN network 460 may be configured to receive the parameters measured by the sensor 360 (e.g., the position/state of the valve and/or an analog pressure value) and to transmit the parameters to the first CAN module 440 and/or the second CAN module 450. The CAN network 460 may also be configured to receive the third signal(s) from the first CAN module 440 and/or the second CAN module 450 and to transmit a fourth signal to control the equipment 350 in response to the third signal(s).

Figure 5A:
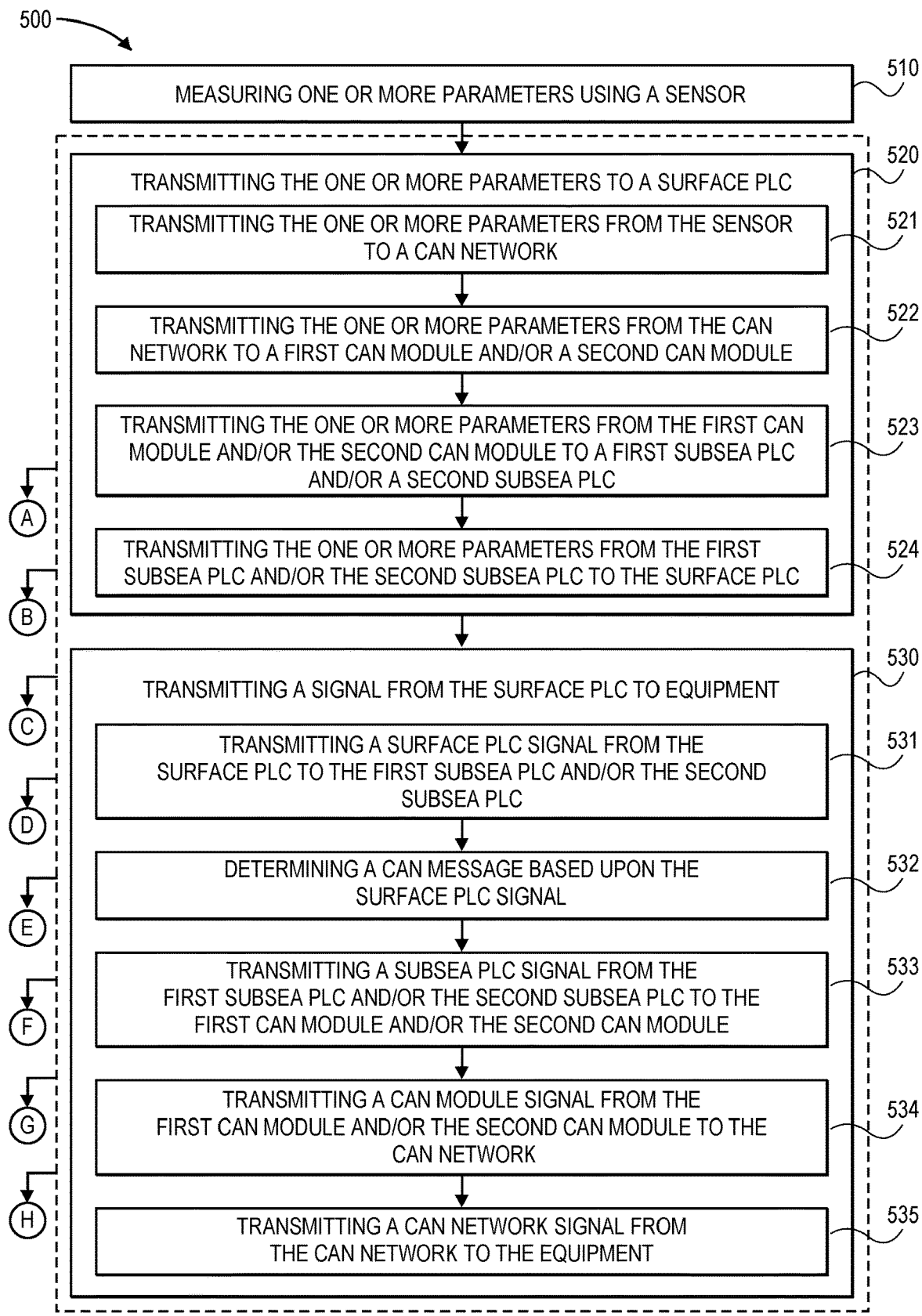
FIGS. 5A-5C illustrate a flowchart of a method for controlling equipment at the wellsite, according to an embodiment.
Figure 5B:
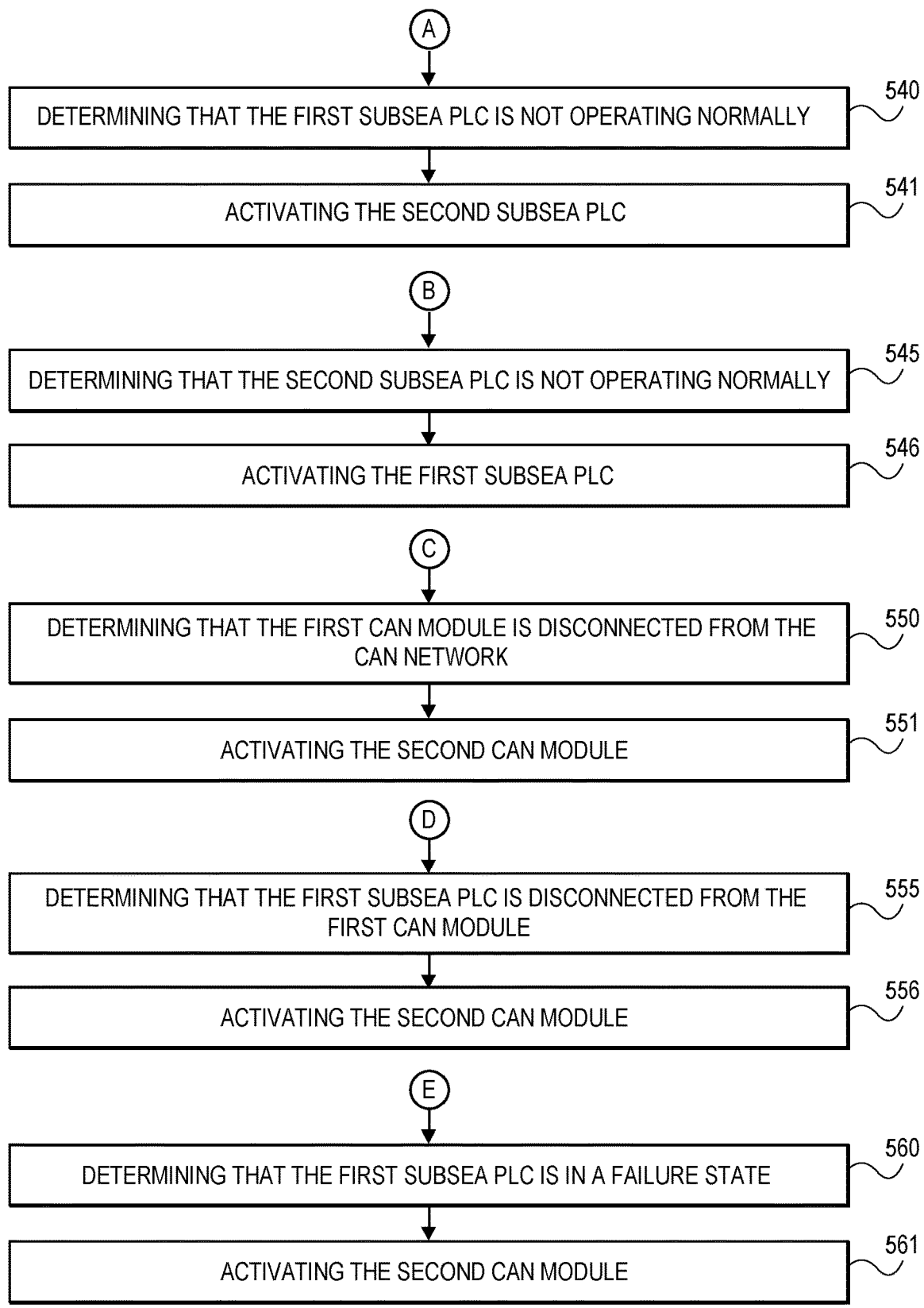
Figure 5C:
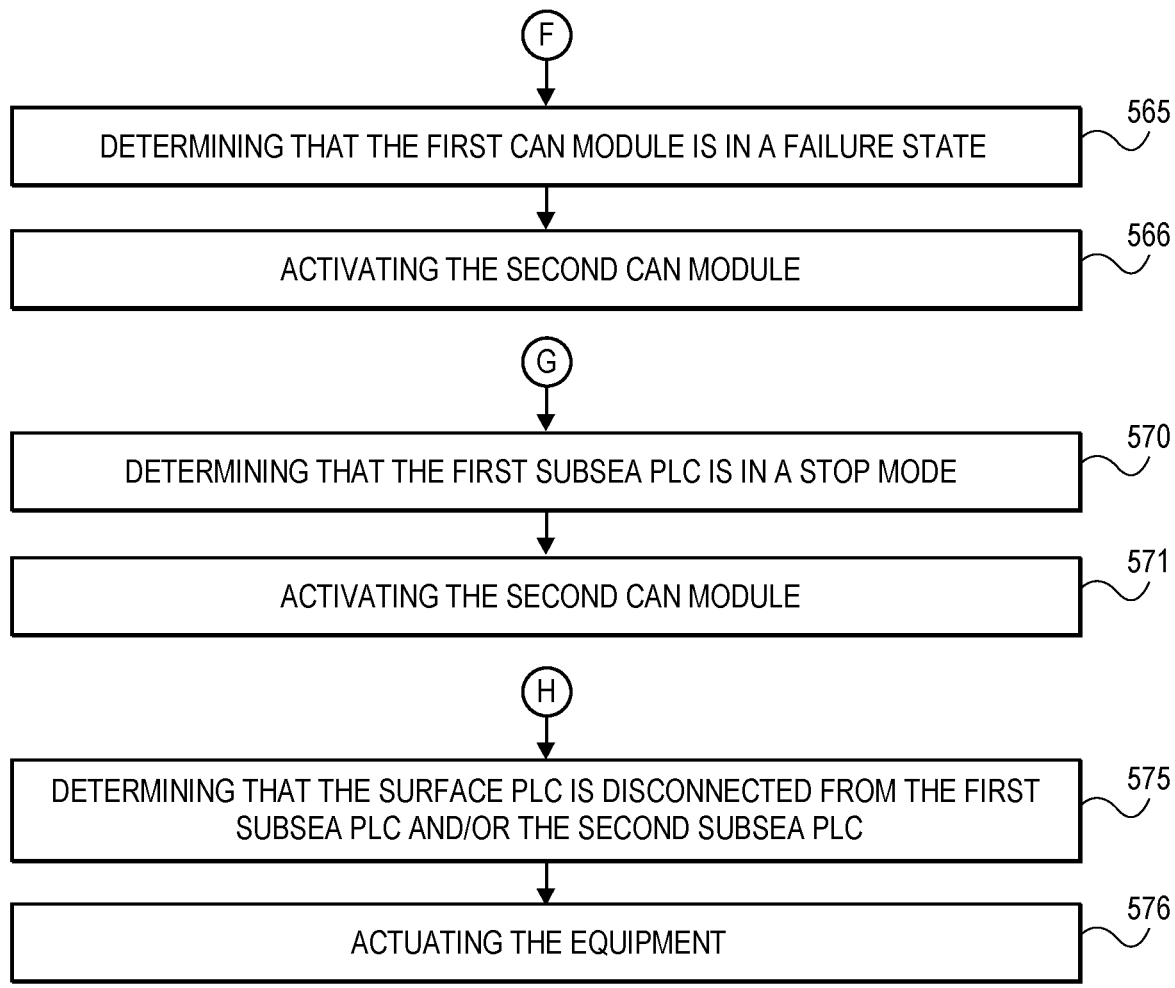

FIGS. 5A-5C illustrate a flowchart of a method 500 for controlling the equipment 350 at the wellsite 300, according to an embodiment. At least a portion of the method 500 may be performed using the system 400. An illustrative order of the method 500 is provided below; however, one or more portions of the method 500 may be performed in a different order, combined, repeated, or omitted.

The method 500 may include measuring one or more parameters using the sensor 360, as at 510.

The method 500 may also include transmitting the one or more parameters to the surface PLC 410, as at 520. Transmitting the one or more parameters to the surface PLC 410 may include transmitting the one or more parameters from the sensor 360 to the CAN network 460, as at 521. Transmitting the one or more parameters to the surface PLC 410 may also include transmitting the one or more parameters from the CAN network 460 to the first CAN module 440, as at 522. This may also or instead include transmitting the one or more parameters from the CAN network 460 to the second CAN module 450. Transmitting the one or more parameters to the surface PLC 410 may also include transmitting the one or more parameters from the first CAN module 440 to the first subsea PLC 420, as at 523. This may also or instead include transmitting the one or more parameters from the second CAN module 450 to the second subsea PLC 430. Transmitting the one or more parameters to the surface PLC 410 may also include transmitting the one or more parameters from the first subsea PLC 420 to the surface PLC 410, as at 524. This may also or instead include transmitting the one or more parameters from the second subsea PLC 430 to the surface PLC 410.

The method 500 may also include transmitting a signal from the surface PLC 410 to the equipment 350, as at 530. As described below, the signal may include instructions for controlling (e.g., actuating) the equipment 350. The signal may be in response to the one or more parameters.

Transmitting the signal to the equipment 350 may include transmitting a first (e.g., surface PLC) signal from the surface PLC 410 to the first subsea PLC 420 and/or the second subsea PLC 430, as at 531.

Transmitting the signal to the equipment 350 may also include determining a CAN message based upon the surface PLC signal, as at 532. The CAN message may be determined by the first subsea PLC 420 and/or the second subsea PLC 430.

Transmitting the signal to the equipment 350 may also include transmitting a second (e.g., subsea PLC) signal from the first subsea PLC 420 and/or the second subsea PLC 430 to the first CAN module 440 and/or the second CAN module 450, as at 533. The downstream second signal(s) may include the CAN message and may be in response to receiving the first signal(s).

Transmitting the signal to the equipment 350 may also include transmitting a third (e.g., CAN module) signal from the first CAN module 440 and/or the second CAN module 450 to the CAN network 460, as at 534. The third signal(s) may include the CAN message and may be in response to receiving the second signal(s).

Transmitting the signal to the equipment 350 may also include transmitting a fourth (e.g., CAN network) signal from the CAN network 460 to the equipment 350, as at 535. The fourth signal may include the CAN message and may be in response to receiving the third signal(s). The fourth signal may cause the equipment 350 to actuate (e.g., from a first position or state to a second position or state). For example, the fourth signal may cause a valve to open or close. In another example, the fourth signal may cause a motor to drive a shaft or a belt.

In one embodiment, the first CAN module 440 may be in a first (e.g., active) mode, and the second CAN module 450 may be in a second (e.g., standby) mode. This may occur, for example, when the system 400 is started-up (i.e., powered-on). When a CAN module is in the first (e.g., active) mode, it is in control, and when a CAN module is in the second (e.g., standby) mode, it is not in control. In one example, a CAN module in the active mode may transmit signals, and a CAN module in the standby mode may not transmit signals. In another example, both CAN modules may transmit signals (e.g., simultaneously), however, the signals from the CAN module in the active mode may control, and the signals from the CAN module in the standby mode may be disregarded.

In one embodiment, the method 500 may include determining that the first subsea PLC 420 is not operating normally, as at 540. The determination may be made by the surface PLC 410 and/or the second subsea PLC 430. The determination may be made when the system 400 is started-up (i.e., powered-on). As used herein, "operating normally" may refer to receiving signals, processing signals, and/or transmitting signals as intended. Thus, not "operating normally" refers to not receiving signals, processing signals, and/or transmitting signals as intended. The method 500 may also include activating the second subsea PLC 430, as at 541. The second subsea PLC 430 may be activated by the surface PLC 410 and/or the first subsea PLC 420 in response to the determination that the first subsea PLC 420 is not operating normally. As used herein, the second subsea PLC 430 being activated means that it switches into the first (e.g., active) mode such that it is now in control instead of the first subsea PLC 420.

In one embodiment, the method 500 may include determining that the second subsea PLC 430 is not operating normally, as at 545. The determination may be made by the surface PLC 410 and/or the first subsea PLC 420. The determination may be made when the system 400 is started-up (i.e., powered-on). The method 500 may also include activating the first subsea PLC 420, as at 546. The first subsea PLC 420 may be activated by the surface PLC 410 and/or the second subsea PLC 430 in response to the determination that the first subsea PLC 420 is not operating normally.

Figure 6:
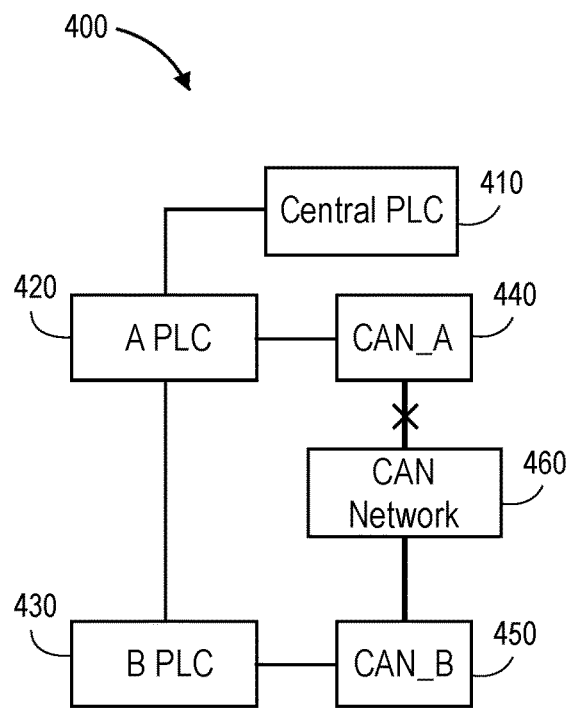
FIG. 6 illustrates the system shown in FIG. 4 with a first controller area network (CAN) module disconnected from a CAN network, according to an embodiment.

In one embodiment, the method 500 may include determining that the first CAN module 440 is disconnected from the CAN network 460, as at 550. This is shown in FIG. 6. The determination may be made by the surface PLC 410, the first subsea PLC 420, the second subsea PLC 430, the first CAN module 440, the second CAN module 450, the CAN network 460, or a combination thereof. As used herein, "disconnected" means unable to communicate with. The method 500 may also include activating the second CAN module 450, as at 551. This may include the first subsea PLC 420 instructing the second subsea PLC 430 to activate the second CAN module 450. The second CAN module 450 may be activated in response to the determination that the first CAN module 440 is disconnected from the CAN network 460. As used herein, the second CAN module 450 being activated means that it switches into the first (e.g., active) mode such that it is now in control over the first CAN module 440.

In one embodiment, the method 500 may include determining that the first subsea PLC 420 is disconnected from the first CAN module 440, as at 555. This is shown in FIG. 7. The determination may be made by the surface PLC 410, the first subsea PLC 420, the second subsea PLC 430, the first CAN module 440, the second CAN module 450, the CAN network 460, or a combination thereof. The method 500 may also include activating the second subsea PLC 430 and/or the second CAN module 450, as at 556. This may include the first subsea PLC 420 instructing the second subsea PLC 430 to activate the second CAN module 450. The second subsea PLC 430 and/or the second CAN module 450 may be activated in response to the determination that the first subsea PLC 420 is disconnected from the first CAN module 440.

In one embodiment, the method 500 may include determining that the first subsea PLC 420 is in a failure state, as at 560. This is shown in FIG. 8. The determination may be made by the surface PLC 410 and/or the second subsea PLC 430. As used herein, the first subsea PLC 420 is in the failure state when it is powered-off or otherwise broken or defective. The "failure state" differs from "not operating normally" in that the device (e.g., the PLC 420) may not respond to commands or transmit any data including its self-status to other devices (e.g., PLCs 410, 430). The method 500 may also include activating the second subsea PLC 430 and/or the second CAN module 450, as at 561. This may include the second subsea PLC 430 activating the second CAN module 450. The second subsea PLC 430 and/or the second CAN module 450 may be activated in response to the determination that the first subsea PLC 420 is in the failure state.

In one embodiment, the method 500 may include determining that the first CAN module 440 is in a failure state, as at 565. This is shown in FIG. 9. The determination may be made by the surface PLC 410, the first subsea PLC 420, and/or the second subsea PLC 430. The method 500 may also include activating the second subsea PLC 430 and/or the second CAN module 450, as at 566. This may include the first subsea PLC 420 instructing the second subsea PLC 430 to activate the second CAN module 450. The second subsea PLC 430 and/or the second CAN module 450 may be activated in response to the determination that the first CAN module 440 is in the failure state.

In one embodiment, the method 500 may include determining that the first subsea PLC 420 is in a stop mode, as at 570. This is shown in FIG. 10. The determination may be made by the surface PLC 410 and/or the second subsea PLC 430. As used herein, the first subsea PLC 420 is in the stop mode when it has power but processing has stopped. The "stop mode" differs from "not operating normally" and/or the "failure state" in that it may stop processing the code stored therein. Therefore, the device (e.g., the first subsea PLC 420) may not respond to commands or transmit any data to other devices (e.g., devices 410, 430, and/or 440). The method 500 may also include activating the second subsea PLC 430 and/or the second CAN module 450, as at 571. This may include the second subsea PLC 430 activating the second CAN module 450. The second CAN module 450 may be activated in response to the determination that the first subsea PLC 420 is in the stop mode.

Figure 11:
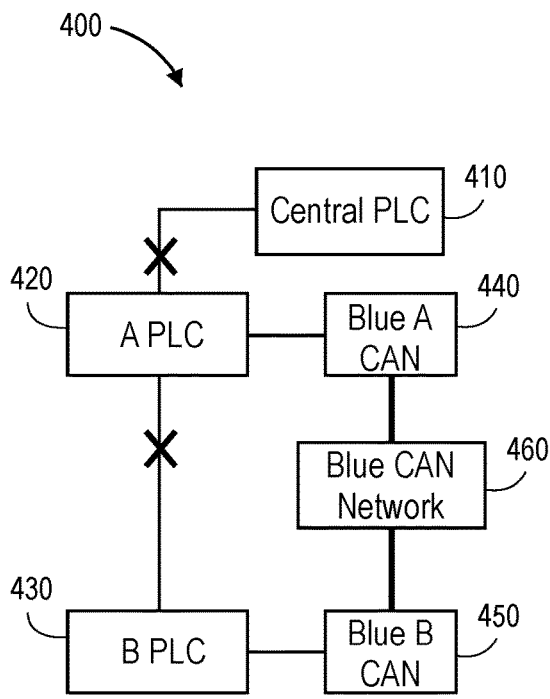
FIG. 11 illustrates the system shown in FIG. 4 with the first subsea PLC and a second subsea PLC disconnected from a surface PLC, according to an embodiment.

In one embodiment, the method 500 may include determining that the surface PLC 410 is disconnected from the first subsea PLC 420 and/or the second subsea PLC 430, as at 575. This is shown in FIG. 11. The determination may be made by the surface PLC 410, the first subsea PLC 420, and/or the second subsea PLC 430. The method 500 may also include actuating the equipment 350, as at 576. This may include the first subsea PLC 420 instructing the first CAN module 440 to actuate the equipment 350 into a closed state. As used herein, the closed state refers to preventing power, communication, and/or fluid flow therethrough.

Flying Master

A flying master is a controller area network (CAN)-open feature (e.g., defined in the CiA 302 standard) that may be used when there are multiple CAN-open master modules 440, 450 existing in the same CAN network 460, but a single CAN-open module 440, 450 may be active at any given time. The present disclosure addresses the issue when a flying master is not available in the system 400, but would be helpful to implement to provide redundancy in the system 400. The flying master realization may be based upon the PLC system 400 (e.g., the CAN modules 440, 450), because these devices may not provide any flying master features or functions. Thus, the software in the system 400 (e.g., the PLC coding) may resolve this problem to make the dual CAN master connection (i.e., redundancy) possible.

CAN-open may run on a CAN physical layer and/or data link layer. This type of system 400 may utilize an embedded system with add-on CAN hardware implementation (e.g., CAN controller chipset, CAN driver chipset etc.). The CAN-open protocol may be adapted in the PLC-based system 400 to expand its capability and flexibility. With the PLC built-in or expansion module, CAN-open communication between the PLCs 410, 420, 430 and the compatible CAN-open devices (e.g., CAN modules 440, 450) may be possible. However, the flying master add-on feature may not be available in the PLC-based CAN-open solution, as it is not a standard for the CAN-open devices (e.g., CAN modules 440, 450).

In some embodiments, the CAN-open master module (e.g., CAN module 440) may serve as the controller/manager of the CAN-open network 460. Thus, the CAN-open master module (e.g., CAN module 440) may control the network behavior of the nodes. The nodes of the network (e.g., CAN network 460), referred to as network management (NMT) slaves, may be controlled by services provided by a NMT master, and may be executed by a NMT master application. In a single master control system, the flying master may not be used (e.g., may be omitted). However, for a control system 400 that incorporates redundancy, two or more masters may be used. As mentioned above, in the PLC-based CAN-open solution, the multiple master configuration may not be possible. The system and method described herein provide the solution to address this issue.

More particularly, the system and method may implement an expansion module for the PLC-based control system 400. The expansion module may be a ProfiNet device in the PLC network. The expansion module may also or instead be a CAN-open device (e.g., CAN module 440, 450) that serves as the network manager in the CAN-open network 460 that includes multiple CAN-open devices which are the slave nodes in the CAN network 460. The PLC CPU may then communicate with the CAN-open devices in the CAN network 460 through this bridge device (e.g., CAN modules 440, 450).

There may be a redundancy PLC that serves as a backup if the primary PLC is down due to any issue that may occur. Thus, there may also be another CAN-open master module 450 that physically connects to the same CAN network 460 so that when the primary PLC (e.g., first subsea PLC 420) and/or the first CAN module 440 fails, this backup PLC (e.g., second subsea PLC 430) and CAN module 450 can take over and keep the system 400 operational without interruption. These two CAN-open communication modules (e.g., CAN modules 440, 450) may not be active at the same time; otherwise, it may destroy the communication of the CAN network 460. The status of the CAN-open modules 440, 450 and information transmission between the subsea PLCs 420, 430 may be monitored so that if the primary subsea PLC 420 and/or primary CAN module 440 has a true failure, the backup subsea PLC 430 and/or backup CAN module 450 can take over the communication and any related activity in a timely manner. With software coding in the PLCs 410, 420, 430, the fail-over logic can be realized.

Thus, the system and method described herein may provide the fail-over logic when the system 400 is in the operation mode so that it may have a seamless switch-over without impacting, or very minimal impact on, the operation of the system 400 when a failure occurs. The system and method may also provide a proper CAN-open configuration when the control system 400 is rebooted from startup or from a power failure. The system and method may also persist a proper operational CAN-open network 460 when two or more of the PLCs 410, 420, 430 lose communication with one another and/or do not know each other's status. In this case, the surface PLC 410 and/or the second subsea PLC 430 may monitor such condition and transmit a command to activate the connected PLC (e.g., second subsea PLC 430) and corresponding CAN-open communication module 450.

The system and method may also provide flexibility so that the user can control which PLC 420, 430 and CAN-open communication module 440, 450 is to be used for the current communication for the system 400 during normal operations, testing, failure modes, or the like. The system and method may also be expanded to other master/slave type communication protocol applications in the PLC-based control system such as Modbus RTU, Profibus etc.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. A system for controlling equipment at a wellsite, the system comprising:
 a surface programmable logic controller (PLC);
 a first subsea PLC configured to connect to the surface PLC;
 a second subsea PLC configured to connect to the first subsea PLC;
 a first controller area network (CAN) module configured to connect to the first subsea PLC;
 a second CAN module configured to connect to the second subsea PLC; and
 a CAN network configured to connect to the first CAN module and the second CAN module,
 wherein the surface PLC is configured to receive one or more parameters that are measured by a sensor, wherein the surface PLC is configured to transmit a first signal to the first subsea PLC, the second subsea PLC, or both in response to the one or more parameters, wherein the first subsea PLC or the second subsea PLC, or both are configured to transmit a second signal to the first CAN module, the second CAN module, or both in response to the first signal, wherein the first CAN module, the second CAN module, or both are configured to transmit a third signal to the CAN network in response to the second signal, and wherein the CAN network is configured to control the equipment in response to the third signal.

2. The system of claim 1, wherein the second CAN module is not configured to perform a flying master operation to detect that the first CAN module is in an active mode, and wherein the surface PLC, the first subsea PLC, the second subsea PLC or a combination thereof are configured to switch the first CAN module into a standby mode and the second CAN module into the active mode.

3. The system of claim 1, wherein the surface PLC is located on a drilling rig, and wherein the drilling rig is positioned above a subsea wellbore.

4. The system of claim 3, wherein the first subsea PLC, the second subsea PLC, the first CAN module, and the second CAN module are located in a subsea electronic module (SEM) which is attached to a blowout preventer (BOP) stack that is at least partially above the subsea wellbore, and wherein the CAN network is distributed across the BOP stack.

5. The system of claim 4, wherein the sensor is connected to the SEM, the BOP stack, the equipment, or a combination thereof.

6. A system for controlling equipment at a wellsite, the system comprising:
   a surface programmable logic controller (PLC) that is located on a drilling rig, wherein the drilling rig is positioned above a subsea wellbore;
   a first subsea PLC configured to connect to the surface PLC, wherein the first subsea PLC is located in a subsea electronic module (SEM) which is attached to a blowout preventer (BOP) stack that is at least partially above the subsea wellbore;
   a second subsea PLC configured to connect to the first subsea PLC, wherein the second subsea PLC is located in the SEM;
   a first controller area network (CAN) module configured to connect to the first subsea PLC, wherein the first CAN module is located in the SEM;
   a second CAN module configured to connect to the second subsea PLC, wherein the second CAN module is located in the SEM; and
   a CAN network configured to connect to the first CAN module and the second CAN module, wherein the CAN network is distributed across the BOP stack,
   wherein the surface PLC is configured to receive one or more parameters that are measured by a sensor, wherein the sensor is configured to monitor the subsea wellbore, the SEM, the BOP stack, the equipment, or a combination thereof, wherein the surface PLC is configured to transmit a first signal to the first subsea PLC, the second subsea PLC, or both in response to the one or more parameters, wherein the first subsea PLC, the second subsea PLC, or both are configured to transmit a second signal to the first CAN module, the second CAN module, or both in response to the first signal, wherein the first CAN module, the second CAN module, or both are configured to transmit a third signal to the CAN network in response to the second signal, and wherein the CAN network is configured to control the equipment in response to the third signal.

7. The system of claim 6, wherein, at system startup, the first CAN module is in an active mode, and the second CAN module is in a standby mode, and wherein the first and second CAN modules are not both in the active mode simultaneously.

8. The system of claim 7, wherein the second CAN module is not configured to perform a flying master operation to detect that the first CAN module is in the active mode, and wherein the surface PLC, the first subsea PLC, the second subsea PLC or a combination thereof are configured to switch the first CAN module into the standby mode and the second CAN module into the active mode.

9. The system of claim 7, wherein the surface PLC, the second subsea PLC, or both are configured to determine that the first subsea PLC is not operating normally, and in response, the first subsea PLC is switched into the standby mode, and the second subsea PLC is switched into the active mode.

10. The system of claim 7, wherein the first subsea PLC is configured to determine that the first CAN module is disconnected from the CAN network, and in response, the first subsea PLC is configured to instruct the second subsea PLC to switch the second CAN module into the active mode.

11. The system of claim 7, wherein the first subsea PLC is configured to determine that the first subsea PLC is disconnected from the first CAN module, and in response, the first subsea PLC is configured to instruct the second PLC to switch the second CAN module into the active mode.

12. The system of claim 7, wherein the surface PLC, the second subsea PLC, or both are configured to determine that the first subsea PLC is in a failure state, and in response, the second subsea PLC is configured to switch the second CAN module into the active mode.

13. The system of claim 7, wherein the first subsea PLC is configured to determine that the first CAN module is in a failure state, and in response, the first subsea PLC is configured to instruct the second PLC to switch the second CAN module into the active mode.

14. The system of claim 7, wherein the surface PLC, the second subsea PLC, or both are configured to determine that the first subsea PLC is in a stop mode, and in response, the second subsea PLC is configured to switch the second CAN module into the active mode.

15. The system of claim 6, wherein the first subsea PLC, the second subsea PLC, or both are configured to determine that the first subsea PLC and the second subsea PLC are disconnected from the surface PLC, and in response, the first subsea PLC instructs the first CAN module to actuate the equipment into a closed state.

16. A method for controlling equipment at a wellsite, the method comprising:
   receiving one or more parameters at a surface programmable logic controller (PLC), wherein the surface PLC is located on a drilling rig, wherein the drilling rig is positioned above a subsea wellbore, wherein the one or more parameters are measured by a sensor, and wherein the sensor is configured to monitor the subsea wellbore, a subsea electronic module (SEM), a blowout preventer (BOP) stack, the equipment, or a combination thereof;
   transmitting a first signal from the surface PLC to a first subsea PLC, a second subsea PLC, or both in response to the one or more parameters;
   transmitting a second signal from the first subsea PLC, the second subsea PLC, or both to a first controller area network (CAN) module, a second CAN module, or both in response to the first signal, wherein one of the first and second CAN modules is in an active mode and the other of the first and second CAN modules is in a standby mode at any given time; and
   transmitting a third signal from the first CAN module, the second CAN module, or both to a CAN network in response to the second signal, and wherein the CAN network is configured to control the equipment in response to the third signal.

17. The method of claim 16, further comprising:
determining that the first subsea PLC is not operating normally; and
in response, switching the first subsea PLC into the standby mode, and the second subsea PLC into the active mode.

18. The method of claim 16, further comprising:
determining that the first CAN module is disconnected from the CAN network; and
in response, switching the second CAN module into the active mode.

19. The method of claim 16, further comprising:
determining that the first subsea PLC is disconnected from the first CAN module; and
in response, switching the second CAN module into the active mode.

20. The method of claim 16, further comprising:
determining that the first subsea PLC is in a failure state; and
in response, switching the second CAN module into the active mode.

\* \* \* \* \*